United States Patent
Aprile et al.

(10) Patent No.: US 12,218,435 B2
(45) Date of Patent: Feb. 4, 2025

(54) MULTI-BEAM ON RECEIVE ELECTRONICALLY-STEERABLE ANTENNA

(71) Applicant: LEONARDO S.P.A., Rome (IT)

(72) Inventors: Angelo Aprile, Pomezia (IT); Giorgio Isella, Pomezia (IT); Eleonora Troysi, Pomezia (IT)

(73) Assignee: LEONARDO S.P.A., Rome (IT)

(*) Notice: Subject to any disclaimer, the term of this patent is extended or adjusted under 35 U.S.C. 154(b) by 0 days.

(21) Appl. No.: 17/616,984

(22) PCT Filed: Dec. 18, 2020

(86) PCT No.: PCT/IB2020/062195
§ 371 (c)(1),
(2) Date: Dec. 6, 2021

(87) PCT Pub. No.: WO2021/124256
PCT Pub. Date: Jun. 24, 2021

(65) Prior Publication Data
US 2022/0344809 A1 Oct. 27, 2022

(30) Foreign Application Priority Data
Dec. 18, 2019 (IT) .................. 102019000024577

(51) Int. Cl.
*H01Q 25/00* (2006.01)
*H01Q 3/34* (2006.01)
*H01Q 21/22* (2006.01)

(52) U.S. Cl.
CPC .............. *H01Q 3/34* (2013.01); *H01Q 21/22* (2013.01); *H01Q 25/002* (2013.01)

(58) Field of Classification Search
CPC ..... H01Q 3/30–36; H01Q 21/22; H01Q 25/00
See application file for complete search history.

(56) References Cited

U.S. PATENT DOCUMENTS

| 5,781,157 A | 7/1998 | Laird |
| 6,653,985 B2* | 11/2003 | Sikina ............. H01Q 21/0087 343/700 MS |
| 9,653,799 B2 | 5/2017 | Pozgay et al. |
| (Continued) | | |

FOREIGN PATENT DOCUMENTS

EP 2613169 A1 7/2013

OTHER PUBLICATIONS

International Preliminary Report on Patentability (IPRP) received in PCT App. No. PCT/IB2020/062195 dated Jul. 1, 2021.

(Continued)

*Primary Examiner* — Hasan Islam
(74) *Attorney, Agent, or Firm* — Dorsey & Whitney LLP

(57) ABSTRACT

A Multi-Beam on Receive Electronically Steerable Antenna comprising a Tx array comprising a phased array of Tx antenna elements and having a geometric aperture with one or more pairs of parallel opposite sides; and an Rx array comprising a phased array of Rx antenna elements and having a geometric aperture with one or more pairs of parallel opposite sides. One or more pairs of parallel opposite sides of the geometric aperture of the Tx array are inclined relative to one or more pairs of parallel opposite sides of the geometric aperture of the Rx array.

16 Claims, 11 Drawing Sheets

(56) References Cited

U.S. PATENT DOCUMENTS 11,031,690 B2 * 6/2021 Shi .................... H01Q 3/2676

OTHER PUBLICATIONS

International Search Report and Written Opinion received in PCT Application No. PCT/IB2020/062195 dated Mar. 15, 2021.
Boag, Aviel, et al., "Grating Lobe Mitigation in Ultra-wideband Phased Arrays", 2018 International Conference on Electromagnetics in Advanced Applications (ICEAA). IEEE, Sep. 10, 2018 (Sep. 10, 2018), pp. 85-86, XP033436224, DOI: 10.1109/ICEAA.2018.8520365.
Kuzmin, Ilya A., et al., "Ring Concentric Modular Antenna Array", 2019 IEEE Conference of Russian Young Researchers in Elect RI CAL and Electronic Engineering (EICONRUS), IEEE, Jan. 28, 2019 (Jan. 28, 2019), pp. 2018-2019, XP033524984, DOI: 10.1109/EICONRUS.2019.8656650.
Zamanifekri, A, et al., "Beam Squint Compensation in Circularly Polarized Offset Reflector Antennas Using a Sequentially Rotated Focal-Plane Array", IEEE Antennas and Wireless Propagation Letters, vol. 14, Dec. 29, 2014 (Dec. 29, 2014), pp. 815-818, XP011576232, ISSN: 1536-1225, DOI: 10.1109/LAWP.2014.2386308.

* cited by examiner

MULTI-BEAM ON RECEIVE ELECTRONICALLY-STEERABLE ANTENNA

CROSS-REFERENCE TO RELATED PATENT APPLICATIONS

This patent application is a U.S. National Stage of PCT Application No. PCT/IB2020/062195 filed on Dec. 18, 2020, which claims priority to Italian Patent Application No. 102019000024577 filed on Dec. 18, 2019, the contents of which are incorporated by reference, in their entirety, for any purpose.

TECHNICAL FIELD OF THE INVENTION

The present invention relates in general to Electronically-Steerable Antennas (ESAs), and in particular to Multi-Beam on Receive (MBR) ESAs.

STATE OF THE ART

FIG. 1 shows graphical representations of operation principles of an MBR ESA compared to a conventional ESA: in an MBR ESA a smaller Tx antenna array illuminates a wide Field Of View (FOV) by means of a floodlight Tx illumination beam, which is electronically steerable by means of a true-time-delay circuitry (or more commonly phase-shifters) within a defined Field Of Regard (FOR), while a larger Rx antenna array generates multiple narrow beam patterns pointing simultaneously at different directions through received signals into antenna sub-arrays connected to associated receiving and ADC chains where the outputs of the antenna sub-arrays are digitally converted and processed, so as to cover the entire angular sector of interest within the Tx illumination beam. For a generic steering direction, the Rx antenna array generates multiple beams at different steering angles which are squinted off each other by a proper shift that is usually proportional to the array beamwidth.

FIGS. 2a and 2b show an MBR ESA Controller comprising a Tx Section (FIG. 2a) designed to cause the Tx array to transmit RF beams having a Tx pattern with a wide Tx beamwidth (floodlight beam), and an Rx Section (FIG. 2b) comprising a beam forming network designed to perform MBR processing, and in particular to cause the Rx array to receive simultaneous multiple RF beams that are processed to simultaneously synthesize multiple Rx beams having Rx patterns with narrow Rx beamwidths, i.e., Rx beamwidths individually narrower than the Tx beamwidth.

FIG. 3 shows the main beam patterns of the simultaneous multiple Rx beams achieved by the digital beam former in FIG. 2b; FIG. 4 shows a Tx pattern (light grey continuous line) and simultaneous multiple Rx patterns (dark grey continuous line) of an MBR ESA, and FIG. 5 shows Tx, Rx, and two-way TRX (Tx-Rx) patterns relevant to one squinted Rx beam.

MBR ESAs may expose the same performance as conventional ESAs, while reducing the probability of interception and supporting simultaneously performed multiple functions. However, in MBR ESAs the side-lobe levels are greater than those in conventional ESAs due to the inevitable phase discontinuities on the squinted beams that are simultaneously generated on receive if the number of digitalised sub-arrays is not high enough.

FIGS. 6a, 6b, and 6c show Rx patterns of simultaneous multiple Rx beams of MBR ESAs composed by 8, 12, and 16 Rx digital channels, respectively. As may be appreciated, the increase of the number and levels of the side-lobe becomes even more problematic when the number of digital Rx channels of the Rx array is limited. In fact, considering the first side-lobe of MBR ESAs composed by 8 Rx digital channels as a reference (FIG. 6a), the use of an higher number of Rx channels brings a SLL improvement of ~3 dB with 12 channels (FIG. 6b) and ~7 dB with 16 channels (FIG. 6c).

Therefore, in order to guarantee the required performance, controlling the side-lobe levels is a key issue in MBR ESAs. In fact, in MBR systems, the side-lobes inevitably increase in level due to the phase discontinuities over sub-arrays when generating squinted simultaneous Rx beams.

As an example, a model of the phase discontinuities is shown in FIG. 7, where the equivalent time-delay $\tau$ (light grey continuous line) of the n-th Rx beam that is obtained from the sum of the single element (dashed line) and the q-th sub-array/Rx digital channel (dots) is depicted, along with the reference time-delay (dark grey continuous line) of a squinted direction with respect to the main one (dashed line).

A number of solutions has been proposed, throughout the past years, to support designers in keeping the side-lobe levels low, in particular within a reference mask defined by tolerated side-lobe levels which guarantees system performance, in mechanical/electronically steerable antennas, most of which techniques are based on the application of non-uniform 2D illumination functions to the radiating field. In ESAs, for example, the control of the illumination patterns is obtained by setting a proper value to the variable attenuators of the TM/RM/TRM modules.

A solution is for example proposed in U.S. Pat. No. 5,781,157 A, which discloses a radar system including a transmitter, a receiver, and a phased array antenna composed of a plurality of subarrays. The transmitter is interconnected with certain laterally located subarrays of the antenna and other centrally disposed subarrays. The subarrays are interconnected via beam formers to a multi-channel receiver providing a radar system having multiple beams with enhanced sidelobe suppression. Another version steers the transmit beams by applying linearly varying phase functions combined with fixed increasing or decreasing phase functions to antenna array radiators.

Another solution is for example proposed in U.S. Pat. No. 9,653,799 B2, which discloses a method of controlling sidelobe distribution in an Active Electronically Steerable Antenna (AESA), including electronically reshaping the array aperture so as to reduce side lobes over a selected region of a coverage volume of the array. In one example, reshaping of the aperture is achieved by electronically turning on and/or off selected radiators in the array to vary the angle of edge discontinuities of the aperture, and thereby move the main side lobes off the principal plane(s) of operation of the array.

EP 2 613 169 A1 discloses a method that digitally distinguishes main lobe detections from grating lobe and side lobe detections without need for added antenna or receiver architecture. The method includes applying receive weights to return radar data for each radar receive element to steer each subarray of a array radar antenna to a direction other than the subarray transmit angle and includes applying a subarray weight to each subarray to generate the array radar antenna receive beam data having magnitude and phase components. The method includes applying predetermined scale factors to the subarray beam data magnitude for each subarray to generate scaled subarray beam data magnitudes. The method includes generating guard beam data for each subarray based on the scaled subarray beam data magnitudes. The method also includes determining if the return radar data corresponds to a main lobe or a grating lobe or side lobe based on the receive beam data and the guard beam data.

KUZMIN ILYA A et al: *Ring Concentric Modular Antenna Array*, 2019 IEEE Conference of Russian Young Researchers in Electrical and Electronic Engineering (EICONRUS), IEEE, 28 Jan. 2019 (2019-01-28) pages 2018-2019, addresses the need to reduce the large number of the antenna elements of an Active Phased Array Antenna (APAA) while maintaining the directional scanning properties of the APAA and proposes increasing the distance between antenna elements by presenting a model of a modular circular antenna array comprising rectangular modules placed in several concentric circles, in which emitters are grouped into row-column rectangular subarrays placed angularly to each other in order to reduce side lobe level and diffraction peaks while scanning.

BOAG AVIEL et al.: *Grating Lobe Mitigation in Ultra-wideband Phased Arrays*, 2018, International Conference on Electromagnetics in Advanced Applications (ICEAA), IEEE, 10 Sep. 2018 (2018-09-10), pages 85-86 discloses a numerically efficient optimization technique aimed at the suppression of grating lobes in ultra-wideband phased array antenna, wherein low computational complexity is achieved through efficient representation of the array factor over the desired band of frequencies and domain of main beam and observation directions. Subarray approach and fast array factor evaluation algorithm further reduce the computational cost.

ZAMANIFEKRI A et al: *Beam Squint Compensation in Circularly Polarized Offset Reflector Antennas Using a Sequentially Rotated Focal-Plane Array*, IEEE, Antennas and Wireless Propagation Letters, Vol. 14, 29 Dec. 2014 (2014-12-29), pages 815-818 addresses the problem of beam squinting in circularly polarized offset reflector antennas and proposes using a focal-plane array concept that consists of sequentially rotated linearly polarized elements and that can be used to facilitate beam steering in full-duplex communication with satellite Internet (VSAT) operating in the Ka-band.

SUBJECT AND SUMMARY OF THE INVENTION

The aim of the present invention is to provide an alternative solution to prior art side-lobe control solutions that allows the number of digital Rx channels required to be simultaneously acquired while operating according to MBR technique to be reduced and, despite this reduction, offering a significant reduction of the side-lobe levels.

The present invention relates to MBR ESAs and to a method of reducing side lobe levels in an MBR ESA, as claimed in the appended claims.

DETAILED DESCRIPTION OF PREFERRED EMBODIMENTS OF THE INVENTION

Figure 1:
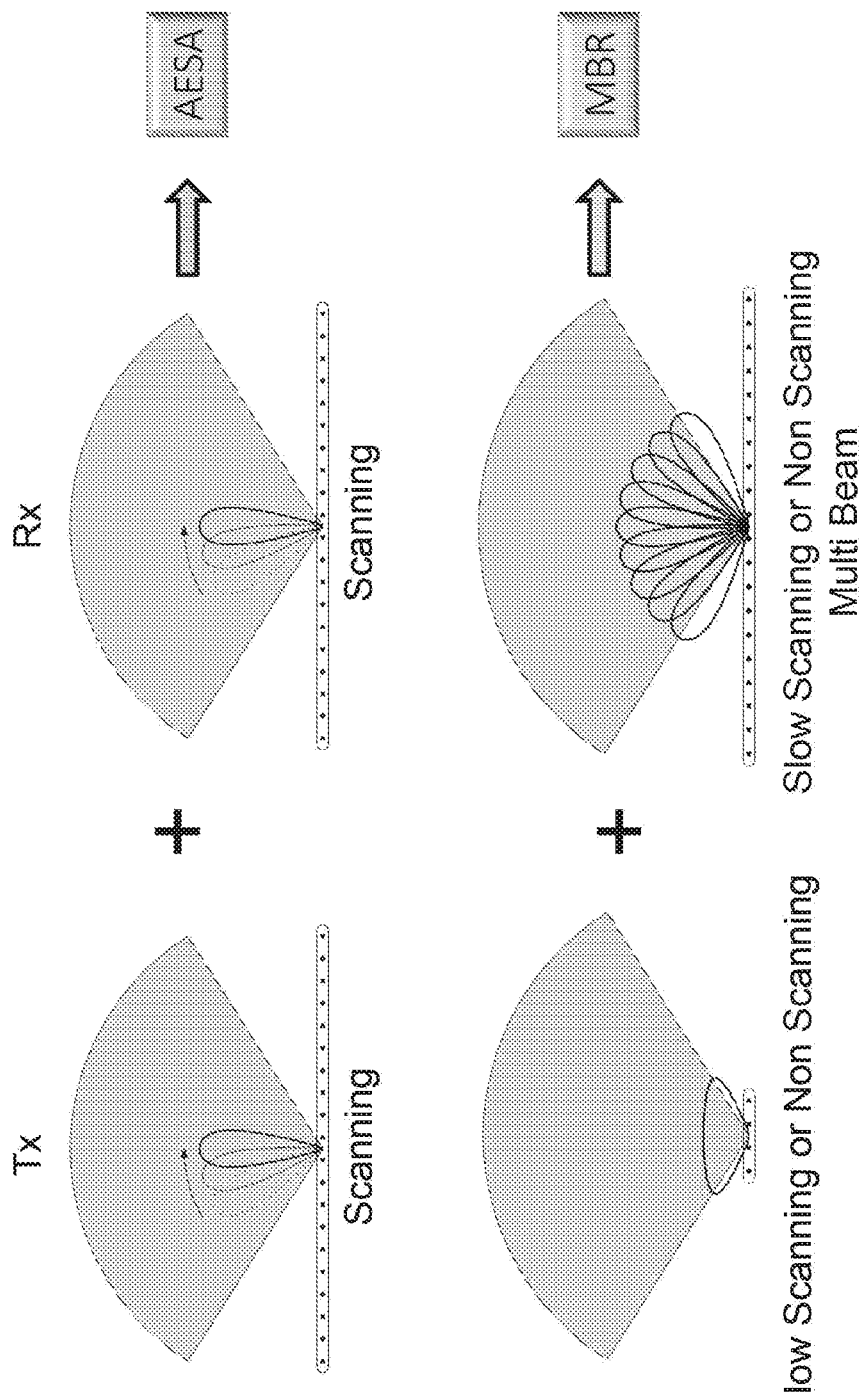
FIG. 1 schematically shows operational principles of an MBR ESA compared to a conventional ESA.

The following description is provided to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

Unless otherwise defined, all technical and scientific terms used herein have the same meaning as commonly understood by one of ordinary skill in the art to which the embodiments disclosed belongs. In the case of conflict, the present specification, including definitions, will control. In addition, the examples are illustrative only not intended to be limiting.

For the purposes of promoting understanding of the embodiments described herein, reference will be made to certain embodiments and specific language will be used to describe the same. The terminology used herein is for the purpose of describing particular embodiments only, and is not intended to limit the scope of the present disclosure.

Considering the radar equation for an MBR ESA, under the hypothesis of disturbance dominated by noise:

$$SNR = \frac{P_{AVG} \cdot \lambda^2}{(4\pi)^3 \cdot k \cdot T_0 \cdot F \cdot L_{RF}} \cdot \frac{RCS}{R^4} \cdot \frac{ToT}{L_{PROC}} \cdot G^{2-way}(\theta, \varphi) \quad (1)$$

$$G^{2-way}(\theta, \varphi) = G^{Tx} \cdot D_{ARR}^{Tx}(\theta, \varphi) \cdot L_{TAP}^{Tx} \cdot G_{EL}^{Tx} \cdot G^{Rx} \cdot D_{ARR}^{Rx}(\theta, \varphi) \cdot L_{TAP}^{Rx} \cdot G_{EL}^{Rx} \quad (2)$$

where:
SNR is the Signal to Noise power ratio at the receiver output;
$P_{Avg}$ is the average transmitted power;
$\theta, \varphi$ are the steering angles
$G^{2-way}(\theta, \phi)$ is the 2-way antenna pattern
$G^{TX}$ and $G^{RX}$ are the Tx and Rx gains, respectively $G_{EL}$ is the gain of each radiating element composing the Tx and Rx arrays $D_{ARR}$ is the directivity of the single array $L_{TAP}$ is the tapering loss due to the non-uniform illumination $\lambda$ is the wavelength of the transmitted waveform ToT is the Time on Target (target illumination interval)

RCS is the target Radar Cross Section $kT_0F$ is the Density of Noise Power $L_{RF}$ is the loss due to the Tx and Rx paths $L_{PROC}$ is the process loss;

R is the sensor to target distance.

The purpose of the present invention may be seen as how to optimize the 2-way antenna pattern $G^{2-way}(\theta, \phi)$. Assuming that both Tx and Rx arrays share the same antenna elements and a uniform tapering is applied in Tx, Equation 2 becomes:

$$G^{2-way}(\theta,\phi) = G^{Tx} \cdot D_{ARR}^{Tx}(\theta,\phi) \cdot G^{Rx} \cdot D_{ARR}^{Rx}(\theta,\phi) \cdot L_{TAP}^{Rx} \cdot G_{EL} \quad (3)$$

$G_{EL}$ depends on the technology of the selected antenna elements, and $G^{TX}$ and $G^{RX}$ depend on the number of radiating elements per array, so the function to be optimized is the two-way TRX directivity function $f^{2-way}(\theta, \phi)$:

$$f^{2-way}(\theta,\phi) \triangleq D_{ARR}^{Tx}(\theta,\phi) \cdot D_{ARR}^{Rx}(\theta,\phi) \quad (4)$$

According to an aspect of the present invention, the two-way TRX directivity function $f^{2-way}(\theta, \phi)$ may be optimized by purposely and appropriately differentiating the geometric apertures or shapes of the Tx and Rx arrays, in particular by introducing a geometric aperture diversity between Tx and Rx arrays that interrupts the geometry communality between the geometric apertures of the Tx and Rx arrays to such an extent as to result in the geometric apertures of the Tx and Rx arrays being geometrically uncorrelated or slightly or just barely correlated.

In particular, differentiation of the geometric apertures of the Tx and Rx arrays is achieved by causing the geometric aperture of the Tx array to be rotated (about the broadside direction orthogonal to the plane of the Tx array) relative to the geometric aperture of the Rx array, while maintaining a common polarization direction between Tx and Rx arrays.

Figure 8B:
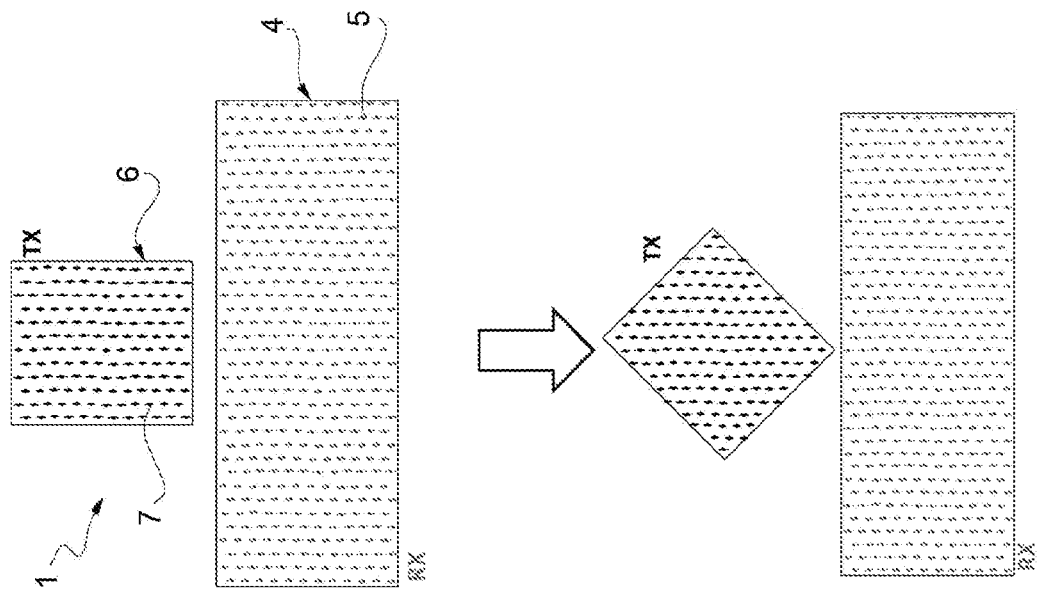
FIGS. 8a and 8b show MBR ESAs with monostatic and bistatic architectures, respectively, and where the Tx array has a four-sided aperture rotated relative to a four-sided aperture of the Rx array.
Figure 8A:
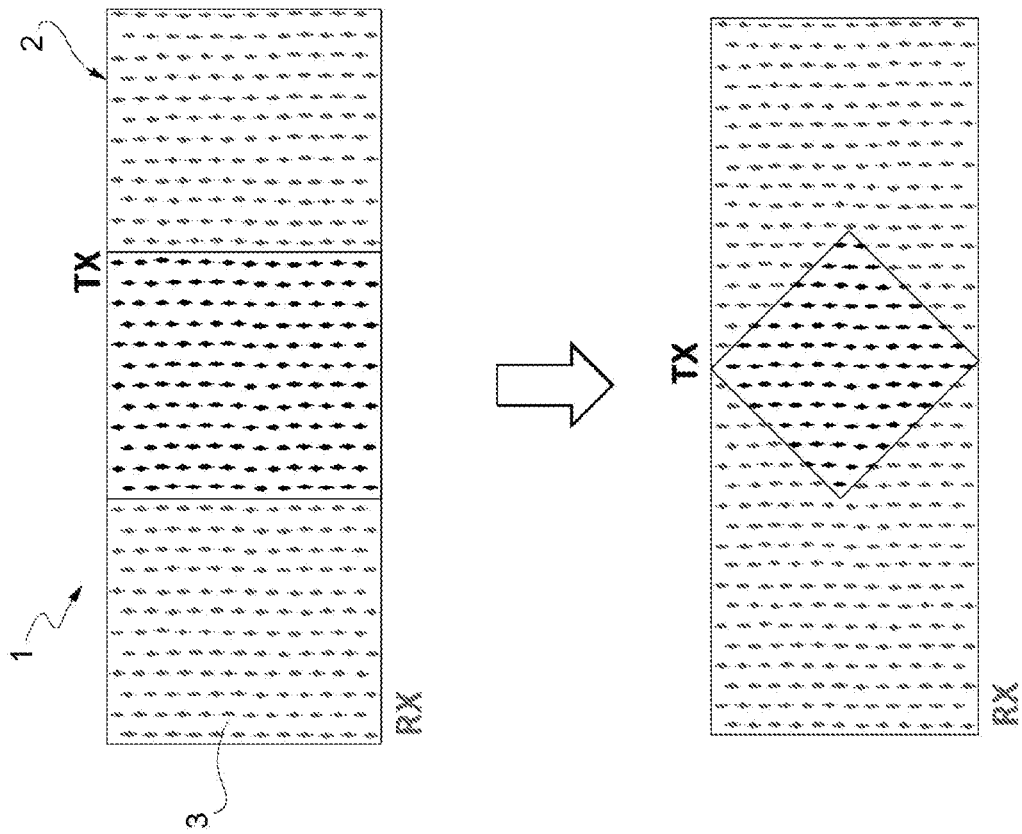

FIGS. 8a and 8b exemplarily show the reduction to practice of the present invention in an MBR ESA, referenced as a whole with reference numeral 1.

In the embodiment exemplarily shown in FIGS. 8a and 8b, the MBR ESA 1 is a planar MBR ESA 1, namely the Tx and Rx arrays are arranged in the antenna plane orthogonal to the broadside direction, with a monostatic architecture (FIG. 8a), namely where the Tx and Rx arrays are collocated in the antenna plane, and with a bistatic architecture (FIG. 8b), namely where the Tx and Rx arrays are physically separated in the antenna plane. In particular, in a monostatic architecture (FIG. 8a), the MBR ESA 1 comprises a 2D Tx-Rx array 2 formed of a fully-populated phased array of collocated transmitting and receiving antenna elements 3 individually selectable to either transmit or receive RF signals, while in a bistatic architecture (FIG. 8b) the MBR ESA 1 comprises a 2D Rx array 4 formed of a fully-populated phased array of Rx-only antenna elements 5, and one or more 2D Tx arrays 6 physically separated from, and coplanar or parallel with, the Rx array 4 and each formed of a fully-populated phased array of Tx-only antenna elements 7.

The Tx-Rx array 2, the Rx array 4, and the Tx array(s) 6 are fully-populated in the sense that the antenna elements 3, 5, and 7 are distributed in the respective arrays 2, 4, and 6 so as to meet the so-called half-wavelength interspacing constraint, i.e., are distributed in the antenna plane so as to be interspaced of about half wavelength ($\lambda/2$). The antenna elements 3, 5, and 7 may be either all excited (switched on) in the respective arrays 2, 4, and 6 or excited according to an appropriate exciting pattern such as an alternate or chess-like pattern, where the antenna elements are alternately switched on and off.

Figure 2B:
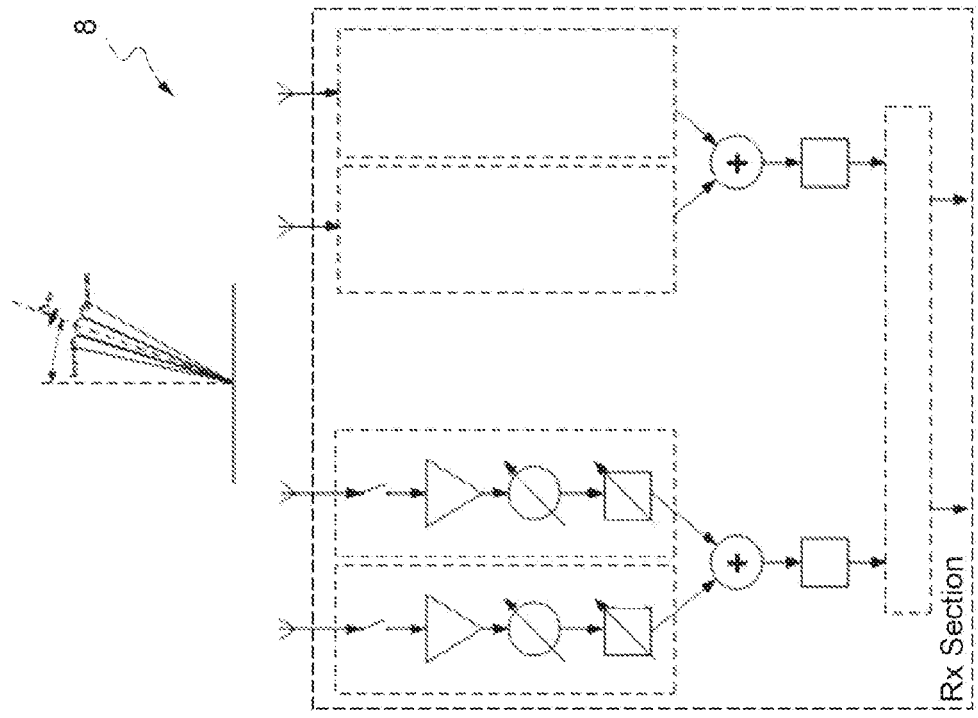
FIGS. 2a and 2b schematically show an MBR ESA Controller with a Tx Section (FIG. 2a) and an Rx Section (FIG. 2b) comprising a beam forming network to perform MBR processing.
Figure 2A:
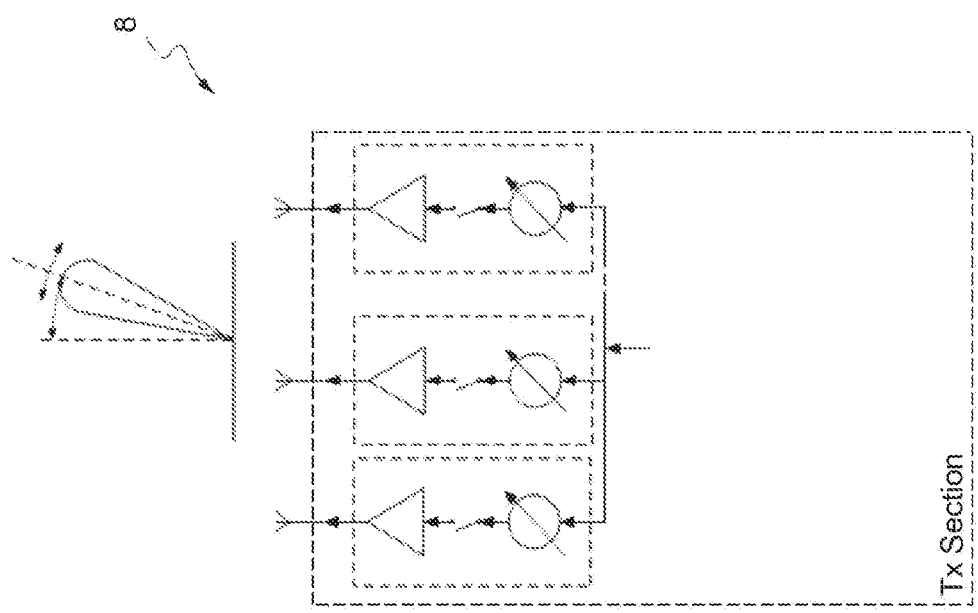
Figure 3:
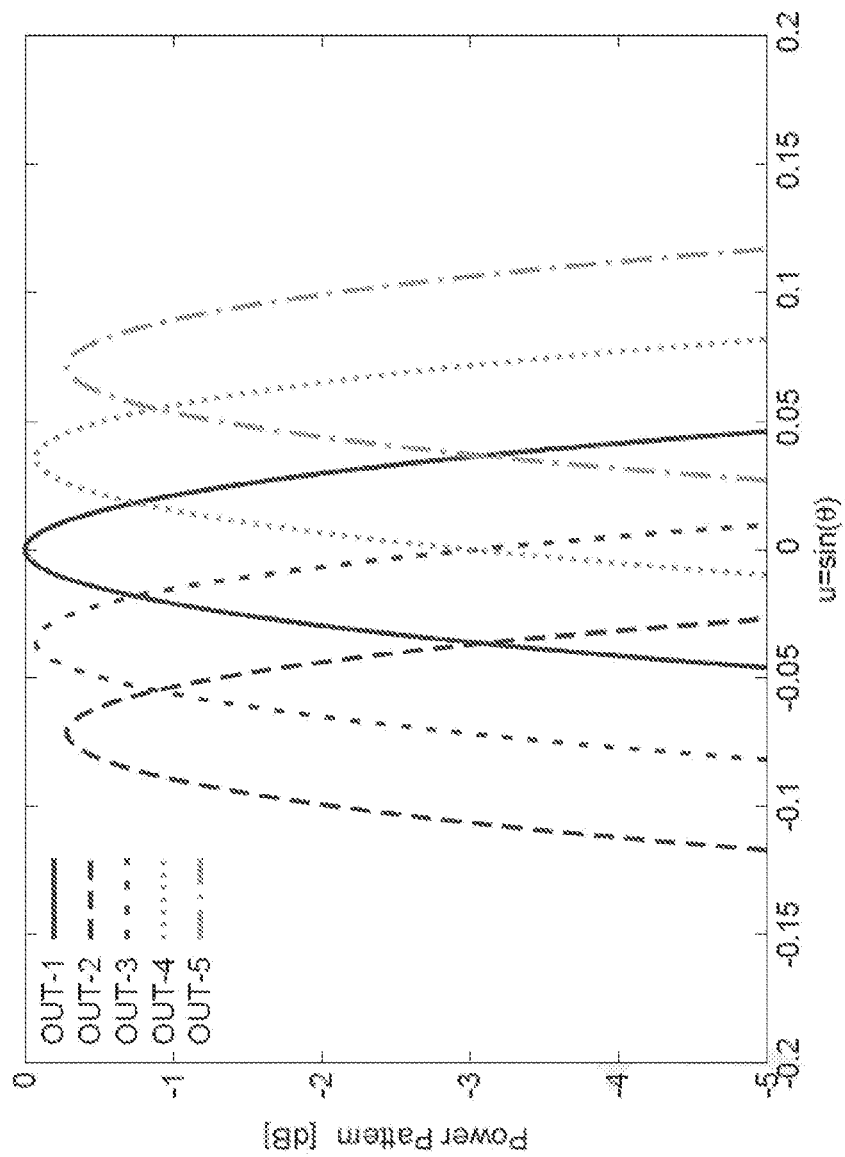
FIG. 3 shows the main beam patterns of simultaneous multiple Rx beams achieved by the digital beam former in FIG. 2b.
Figure 4:
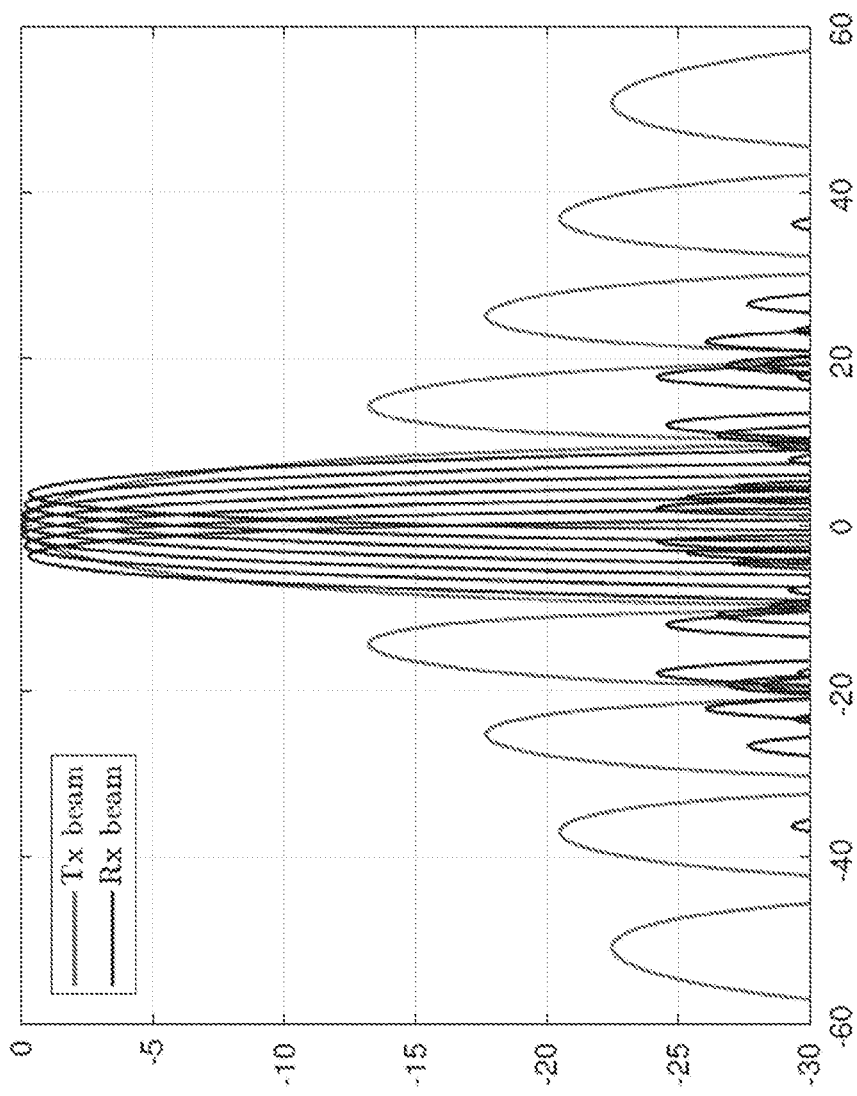
FIG. 4 shows a Tx pattern and simultaneous multiple Rx patterns of an MBR ESA.
Figure 5:
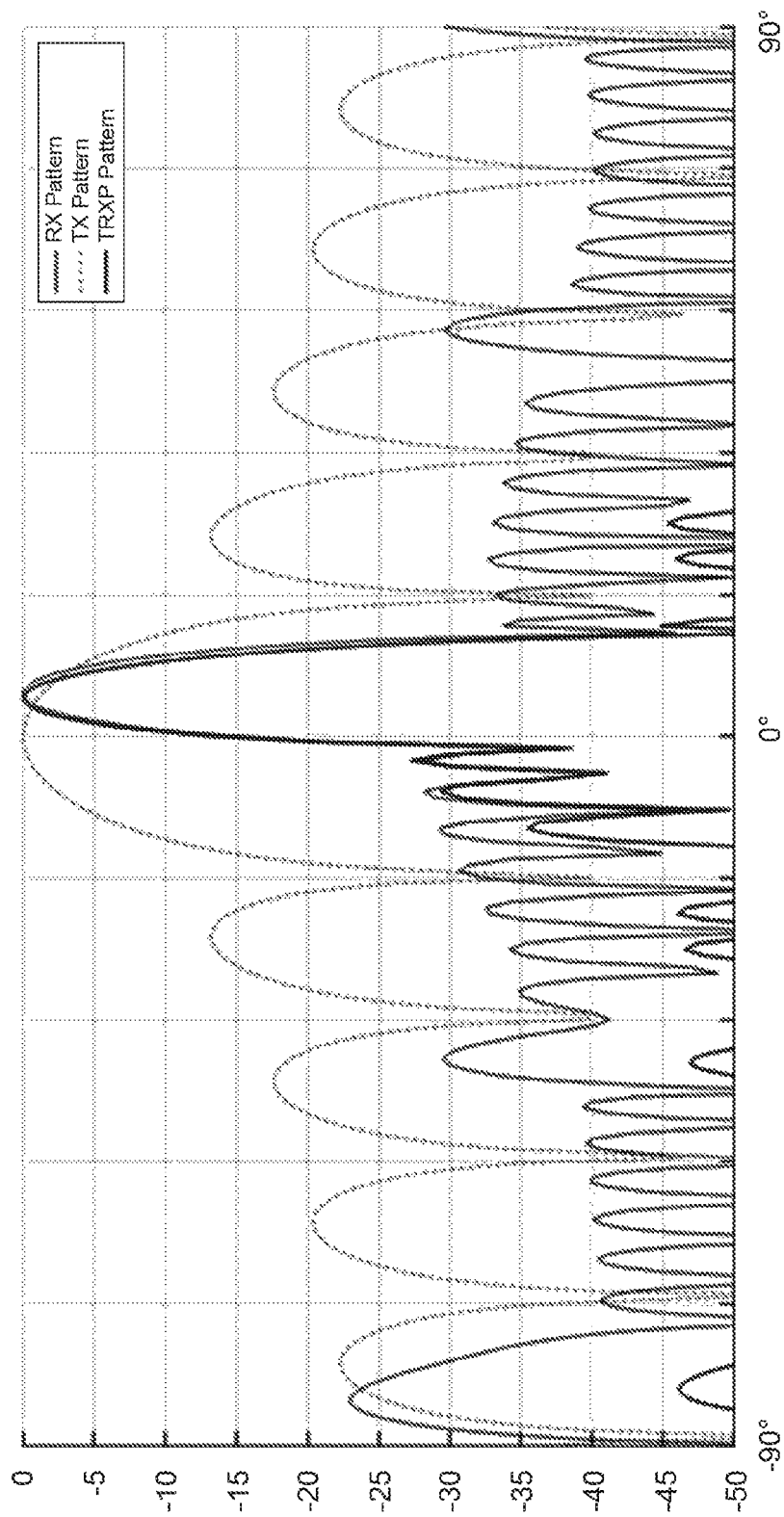
FIG. 5 shows Tx, Rx, and two-way TRX patterns relevant to one squinted Rx beam.
Figure 6A:
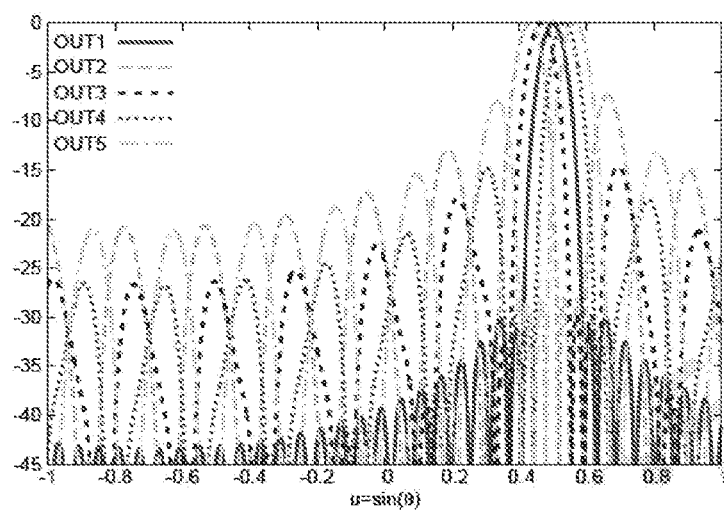
FIGS. 6a, 6b, and 6c show Rx patterns of simultaneous multiple Rx beams of MBR ESAs composed by 8, 12, and 16 Rx digital channels, respectively.
Figure 6B:
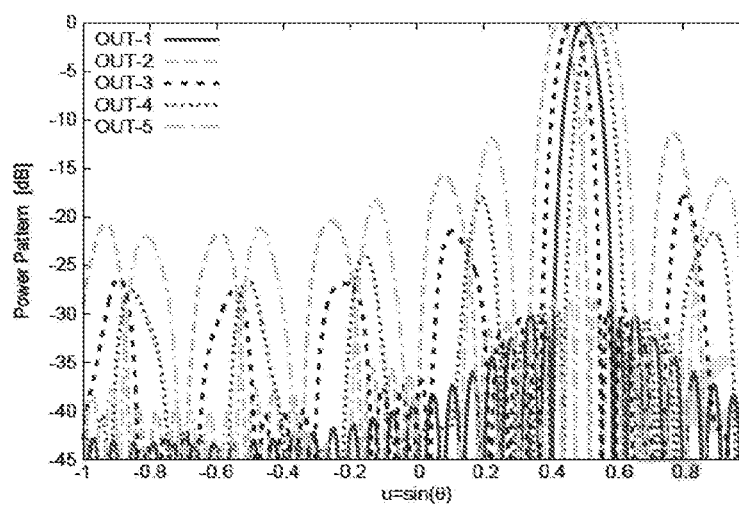
Figure 6C:
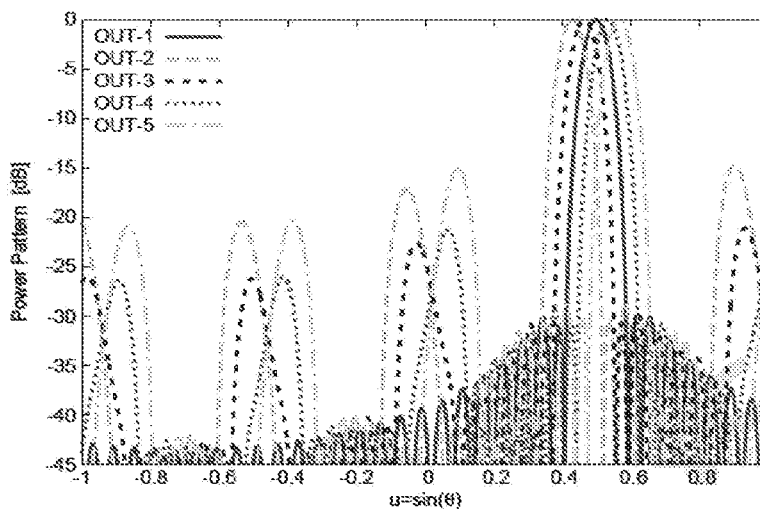
Figure 7:
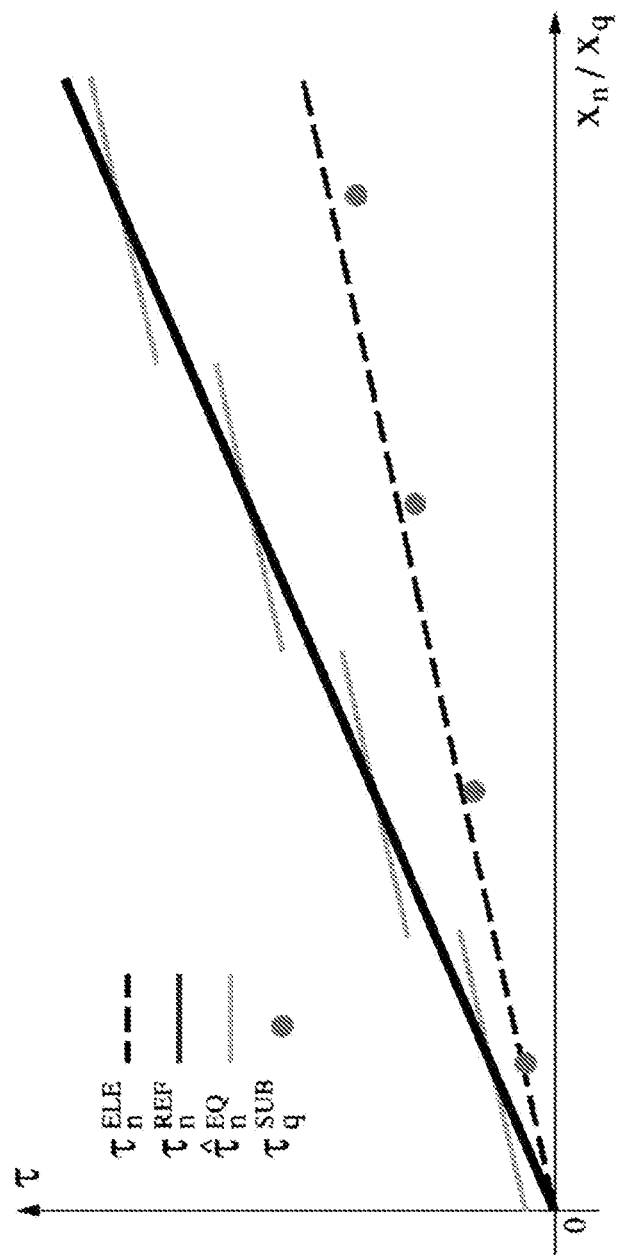
FIG. 7 shows a diagram plotting phase shift discontinuities over sub-arrays.

In both architectures, an Antenna Controller 8 (see FIGS. 2a and 2b) is provided to cause the Tx antenna elements to transmit RF beams having a scanning or non-scanning Tx pattern with a wide Tx beamwidth (floodlight beam), and the Rx antenna elements to receive simultaneous multiple RF beams that are processed to simultaneously synthesize multiple scanning or non-scanning Rx beams having Rx higher gain patterns with narrow Rx beamwidths, i.e., Rx beamwidths individually narrower than the Tx beamwidth.

In both architectures, the number of Tx antenna elements is lower than the number of Rx antenna elements, the Tx beam has a lower directivity than the individual Rx beams so as to result in the Tx beam having a wider azimuthal and/or elevational beamwidth than the individual Rx beams.

In the embodiment exemplarily shown in FIGS. 8a and 8b, both the Tx antenna elements and the Rx antenna elements are arranged to form, in the antenna plane, respective 2D four-sided (or parallelogram-shaped or quadrilateral) geometric apertures with two pairs of parallel opposite (or facing) sides.

The Tx and Rx antenna elements are uniformly distributed in a lattice (or grid or grating) structure which, in the embodiment exemplarily shown in FIGS. 8a and 8b, is triangular, namely where the antenna elements are staggered between rows and columns. It goes without saying that the lattice structure could be different from triangular, in particular could be rectangular, and the lattice structure could be equilateral or non-equilateral.

In the prior art solutions, each pair of parallel opposite sides of the four-sided aperture of the Tx array is parallel to a pair of parallel opposite sides of the four-sided aperture of the Rx array.

In the present invention, the four-sided aperture of the Tx array is rotated relative to the four-sided aperture of the Rx array to such an extent that each pair of parallel opposite sides of the four-sided aperture of the Tx array is inclined or tilted relative to an homologous pair of parallel opposite sides of the four-sided aperture of the Rx array by a non-zero angle $\alpha$ other than, in particular lower than, 90°.

In more detail, in the embodiment exemplarily shown in FIGS. 8a and 8b, the Tx array has a square-shaped aperture, while the Rx array has a rectangle-shaped aperture.

In the above-described prior art solutions, each pair of parallel opposite sides of the square-shaped aperture of the Tx array is parallel to the associated pair of parallel opposite sides of the rectangular-shaped aperture of the Rx array.

In the present invention, the square-shaped aperture of the Tx array is rotated of an angle of 45° relative to the rectangle-shaped aperture of the Rx array, such that each pair of the parallel opposite sides of the square-shaped aperture of the Tx array is inclined of 45° relative to a pair of the parallel opposite sides of the rectangle-shaped aperture of the Rx array.

Those skilled in the art may appreciate, given the benefit of this disclosure, that many other variation may be implemented in accord with the principles disclosed herein.

In particular, in a different embodiment, even a single pair of parallel opposite sides of the square-shaped aperture of the Tx array could be inclined relative to a pair of parallel opposite sides of the rectangle-shaped aperture of the Rx array, while the other pairs of parallel opposite sides could be parallel.

This could be, for example, the case in which the Tx array has a square-shaped aperture, while the Rx array has a parallelogram-shaped aperture with shorter sides inclined of 45° relative to the longer sides, and the square-shaped aperture of the Tx array is rotated of an angle of 45° relative to the parallelogram-shaped aperture of the Rx array, such that a pair of parallel opposite sides of the square-shape aperture of the Tx array is inclined of 45° relative to the pair of the longer sides of the parallelogram-shaped aperture of the Rx array, while the other pair of parallel opposite sides of the square-shaped aperture of the Tx array is parallel to the pair of the shorter sides of the parallelogram-shaped aperture of the Rx array.

Other examples could involve four-sided apertures of the Tx and Rx arrays such as non-right angled rhomboids or rhombuses (equilateral quadrilaterals).

The Applicant has experienced that similar benefits in terms of side-lobe level reduction as those that four-sided apertures of the Tx and Rx arrays allow to achieve may be also achieved by any polygonal apertures with one or more pairs of parallel opposite sides, and where the geometric aperture diversity between the Tx and Rx arrays interrupts the geometry communality between the geometric apertures of the Tx and Rx arrays to such an extent as to result in the geometric apertures of the Tx and Rx arrays being geometrically uncorrelated or slightly or just barely correlated.

The high side-lobe levels along the cardinal planes and that originate from the parallelism between the associated pairs of the parallel opposite sides of the geometric apertures of the Tx and Rx arrays are mitigated in the present invention: the near-side-lobe levels are reduced and, as the null angles of the Tx pattern differ from those of the Rx pattern, the mid-far side-lobes of the two-way TRX pattern are almost cancelled.

Figure 9A:
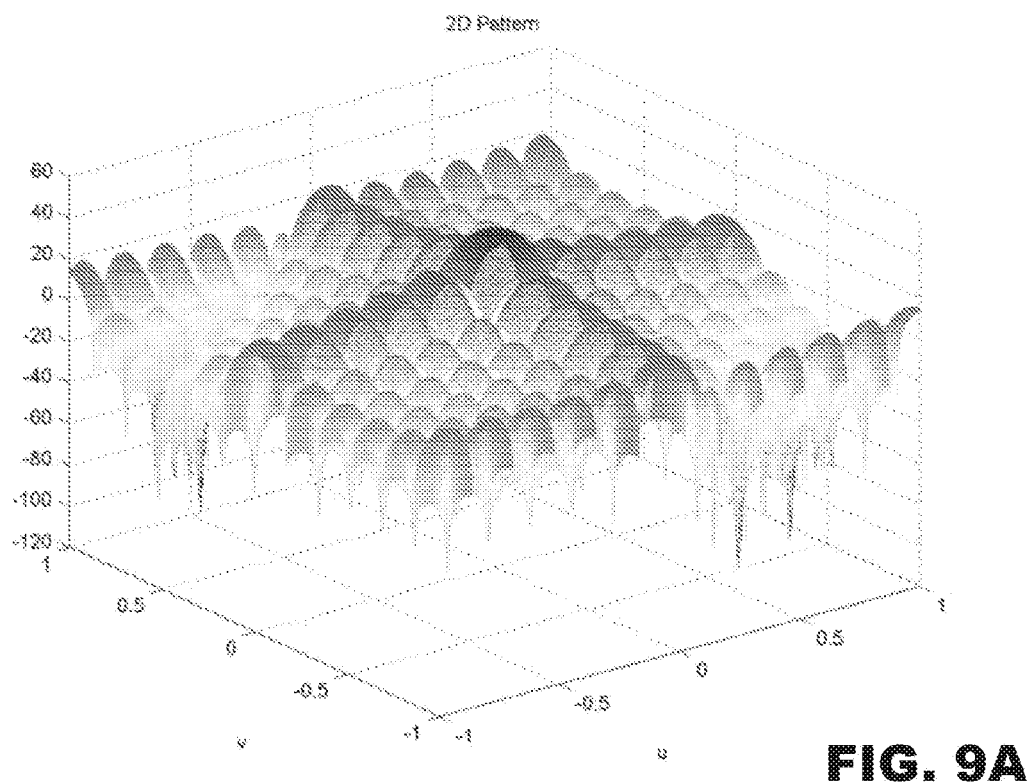
FIGS. 9a and 9b show 3D Tx patterns of a Tx array when it is not rotated relative to the Rx array and, respectively, when it is rotated of an angle of 45° relative to the Rx array.
Figure 9B:
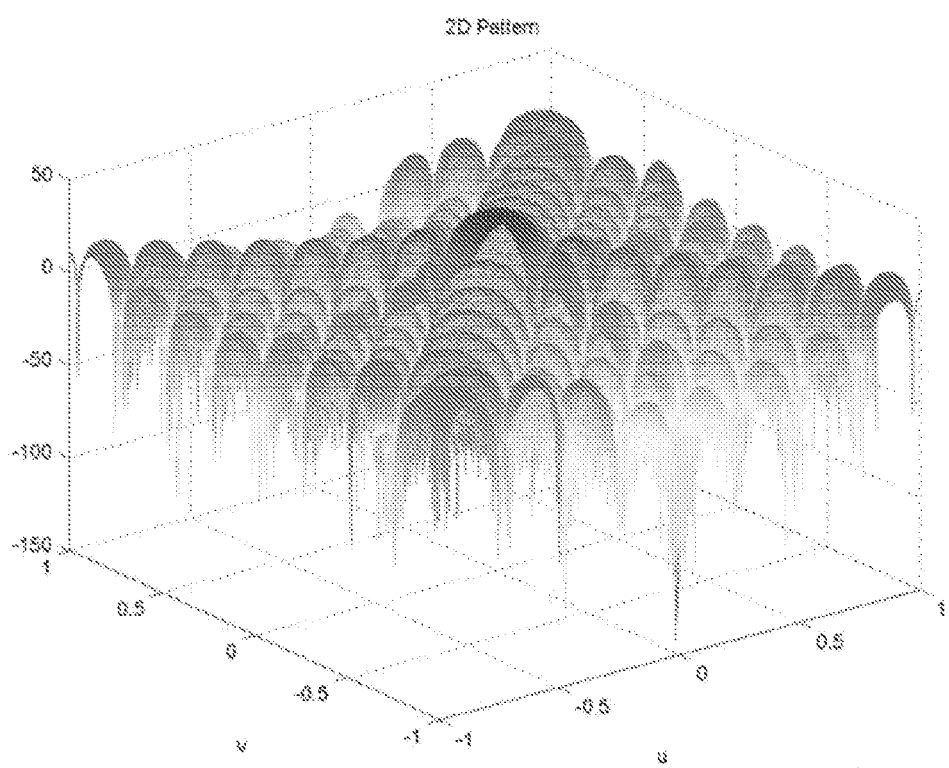

FIGS. 9a and 9b show 3D transmit patterns ($D_{ARR}^{Tx}(\theta, \varphi)$) of a fully-populated Tx array formed of 12×12 antenna elements and where the square-shaped aperture of the Tx array in not rotated relative to the rectangular-shaped aperture of the Rx array ($\alpha=0°$) and, respectively, the square-shaped aperture of the Tx array is rotated relative to the rectangular-shaped aperture of the Rx array ($\alpha=45°$).

Figure 10A:
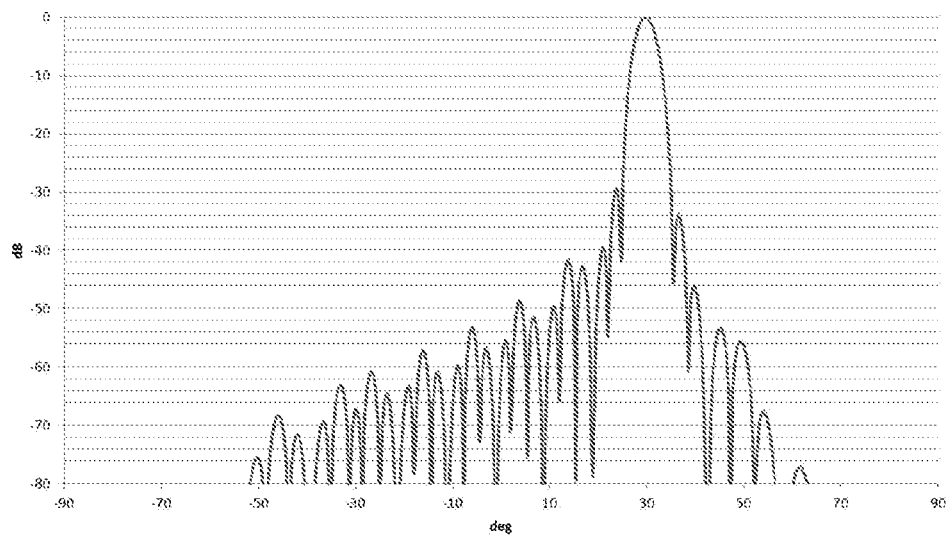
FIGS. 10a and 10b show the two-way TRX patterns of an MBR ESA steering at 30° azimuth direction and with a regular lattice and uniform illumination, when the Tx array is not rotated relative to the Rx array and, respectively, when it is rotated of an angle of 45° relative to Rx array.
Figure 10B:
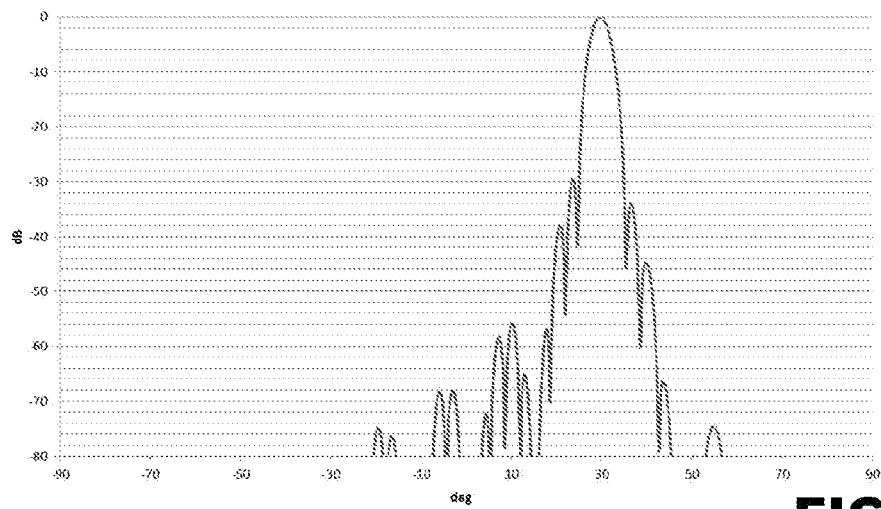
Figure 10C:
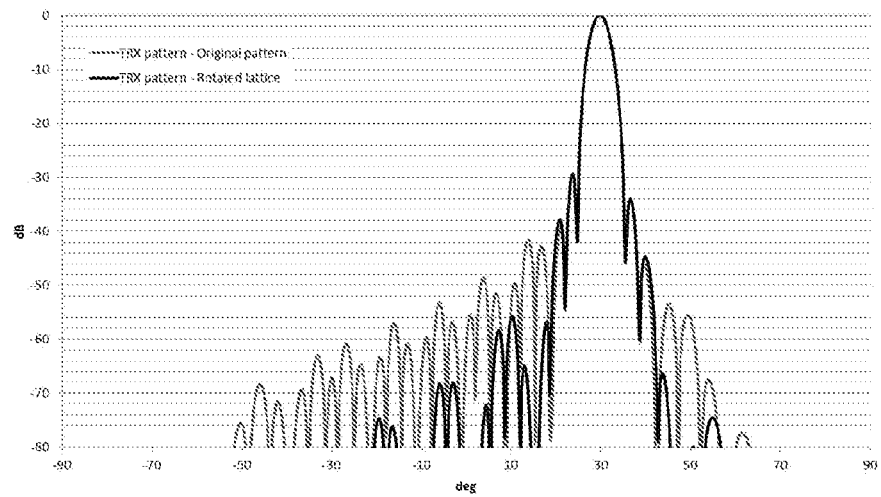
FIG. 10c show the superimposition of the two-way TRX patterns shown in FIGS. 10a and 10b.

FIGS. 10a and 10b show the two-way TRX patterns ($f^{2-way}(\theta, \varphi)$) of an MBR ESA steering at 30° azimuth direction (for the sake of clarity, only one Rx beam is shown) of a fully-populated Tx array with 12×12 antenna elements and an Rx array with 36×12 antenna elements, with a regular lattice and where the square-shaped aperture of the Tx array in not rotated relative to the rectangular-shaped aperture of the Rx array ($\alpha=0°$) and, respectively, the square-shaped aperture of the Tx array in rotated relative to the rectangular-shaped aperture of the Rx array ($\alpha=45°$. FIG. 10c shows a superimposition of the two-way TRX patterns shown in FIGS. 10a and 10b.

It may be appreciated that when the square-shaped aperture of the Tx array in rotated relative to the rectangular-shaped aperture of the Rx array (FIG. 10b, $\alpha=45°$), the mid-far side-lobe levels are remarkably reduced compared to those when where the square-shaped aperture of the Tx array in not rotated relative to the rectangular-shaped aperture of the Rx array (FIG. 10a, $\alpha=0$), while the benefit on the near side-lobes is limited because the first side-lobe of the Rx array still lies inside the main-lobe of the Tx array.

In order to keep the near-side-lobe levels within a reference mask defined by tolerated side-lobe levels which guarantees system performance also in MBR ESAs with a limited number of digital Rx channels, a specific illumination function may be applied to the attenuators and to the phase shifters of the Rx array. Outside of the main-lobe of the Tx array the side-lobe level reduction achieved by rotating the geometric aperture of the Tx array is already effective, so the optimization may conveniently be focused in a limited region close to the main-lobe only.

Traditional weighting window-based techniques, such as Taylor, Hamming, Hanning, Blackman-Harris, etc., should be discarded because they would result in an excessive tapering loss and in further improvement (not strictly necessary in case of rotated Tx array with respect to Rx array) of the mid-far side-lobe levels.

According to another aspect of the present invention, the Antenna Controller 8 is further designed to cause an optimized tapering function to be applied to the near side-lobes only, i.e., with more stringent thresholds for near side-lobes and more relaxed thresholds for far side-lobes, without introducing excessive weighting loss. This optimization may be achieved by applying the optimized tapering function either on the Rx pattern only or on the 2-way pattern, considering all directions in azimuth and elevation for side-lobe minimization.

Figure 11:
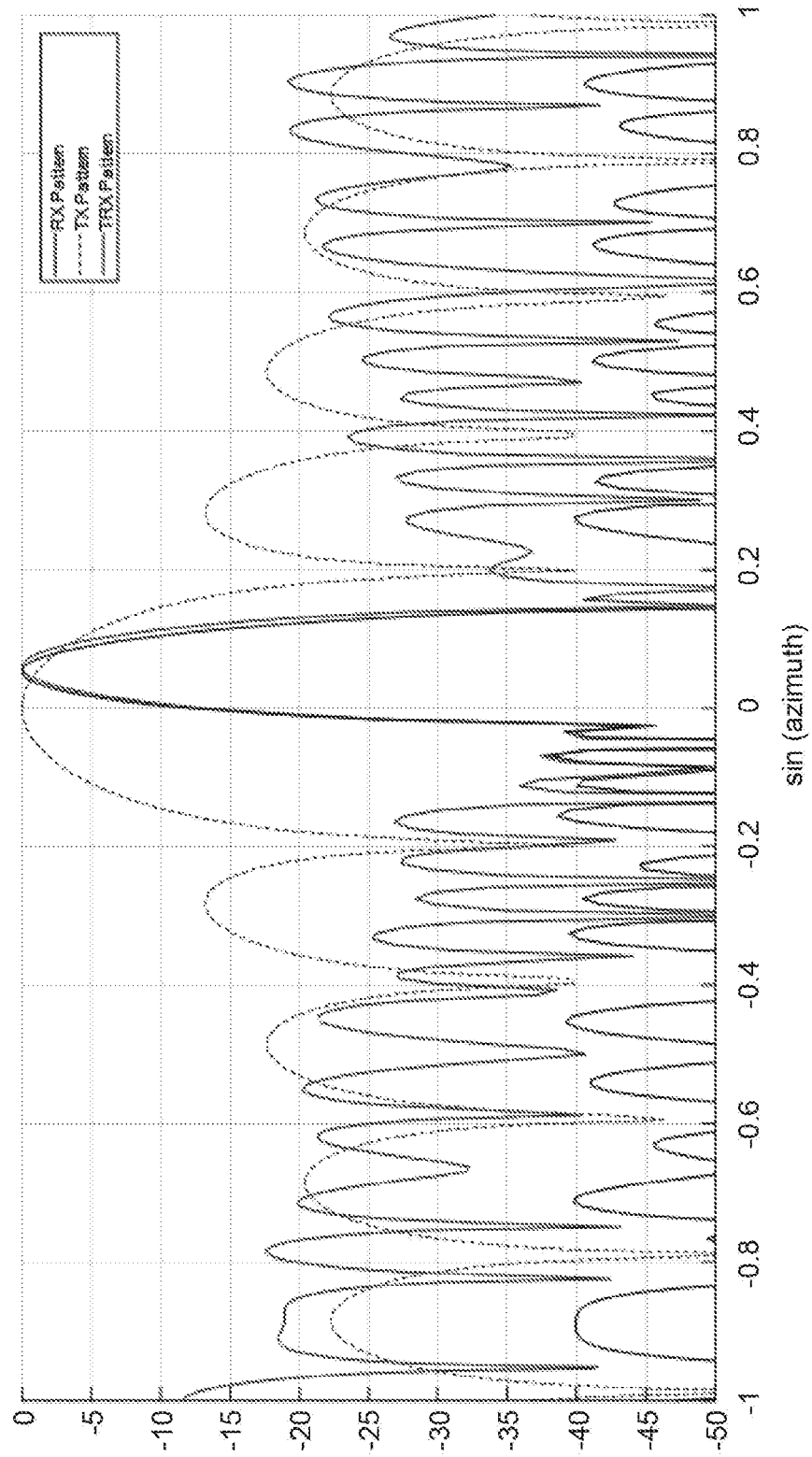
FIG. 11 shows the 2-way pattern (dark grey continuous line) of an MBR ESA resulting from the Rx pattern optimization on a squinted Rx beam (light grey continuous line).

FIG. 11 shows the 2-way pattern (dark grey continuous line) of an MBR ESA resulting from the Rx pattern optimization on a squinted Rx beam (light grey continuous line). In FIG. 11, the depicted Tx pattern (dashed line) derives from the pattern synthesis of the original Tx pattern, i.e., the non-rotated one, and this results in the mid-far side-lobe levels being relatively high.

The advantages that the present invention allows to achieve compared to the prior art solutions may be appreciated in view of the foregoing description.

In particular, the present invention finds application to any MBR ESAs and not only to traditional AESAs without physical separation and dimensional diversity between Tx and Rx arrays, so resulting in both mono static and bistatic architectures being embraced.

Besides, the application of the present invention to MBR ESAs results in a significant reduction of the mid-far side-lobes thanks to the rotation of the Tx array with respect to the broadside direction, and of the near side-lobes thanks to the application of optimized weighting coefficients, whereby ensuring system performance improvements without using a high number of Rx digital channels.

Moreover, the present invention extends the geometric aperture diversity of the Tx and Rx arrays to any polygonal TX and Rx patterns, so resulting in an improved flexibility of exploitation of MBR ESAs embodying the present invention.

The invention claimed is:

1. A planar or quasi-planar Multi-Beam on Receive Electronically Steerable Antenna (MBR ESA) comprising:
    a transmit (Tx) array comprising a phased array of Tx antenna elements and having, in a Tx array plane, a first geometric aperture with one or more first pairs of parallel opposite sides;
    a receive (Rx) array comprising a phased array of Rx antenna elements and having, in an Rx array plane either coplanar with or parallel to the Tx array plane, a second geometric aperture with one or more second pairs of parallel opposite sides;
    the first geometric aperture of the Tx array is rotated relative to the second geometric aperture of the Rx array to such an extent that one or more first pairs of parallel opposite sides of the first geometric aperture of the Tx array are inclined or tilted relative to one or more second pairs of parallel opposite sides of the second geometric aperture of the Rx array by a non-zero angle other than, in particular lower than, 90°;

the MBR ESA further comprises an Antenna Controller designed to cause the Tx antenna elements to transmit an RF Tx beam having a Tx pattern with a wide Tx beamwidth, and the Rx antenna elements to simultaneously receive multiple RF beams processable to simultaneously synthesize multiple Rx beams from the multiple RF beams, the multiple Rx beams having Rx patterns with Rx beamwidths individually narrower than the Tx beamwidth;

a number of Tx antenna elements is lower than a number of Rx antenna elements;

the Tx beam has a lower directivity than individual ones of the multiple Rx beams so as to result in the Tx beam having a wider azimuthal and/or elevational beamwidth than the individual ones of the multiple Rx beams; and the Tx array has a gain lower than the Rx array.

2. The Multi-Beam on Receive Electronically Steerable Antenna of claim 1, wherein the first and second geometric apertures of the Tx and Rx arrays each comprises at least two pairs of parallel opposite sides;

and wherein the first geometric aperture of the Tx array is rotated relative to the second geometric aperture of the Rx array to such an extent that both first pairs of parallel opposite sides of the first geometric aperture of the Tx array are inclined or tilted relative to both second pairs of parallel opposite sides of the second geometric aperture of the Rx array.

3. The Multi-Beam on Receive Electronically Steerable Antenna of claim 1, wherein the first and second geometric apertures of the Tx and Rx arrays are four-sided.

4. The Multi-Beam on Receive Electronically Steerable Antenna of claim 3, wherein the first geometric aperture of the Tx array is either a square or a rhomb, and the second geometric aperture of the Rx array is either a rectangle or a parallelogram.

5. The Multi-Beam on Receive Electronically Steerable Antenna of claim 1, wherein the Antenna Controller is further designed to cause a tapering function to be applied either to the Rx patterns only or to the Tx-Rx pattern, with one or more lower thresholds associated to the near side-lobes and one or more higher thresholds associated to the mid-far side-lobes.

6. The Multi-Beam on Receive Electronically Steerable Antenna of claim 1 and having a bistatic architecture where the Tx and Rx arrays are physically separated, and the Tx array is formed of Tx-only antenna elements and the Rx array is formed of Rx-only antenna elements.

7. The Multi-Beam on Receive Electronically Steerable Antenna of claim 1 and having a monostatic architecture, where the Tx and Rx arrays are co-located to form a Tx-Rx array where the antenna elements are both transmitting and receiving antenna elements and are individually selectable to either transmit or receive RF signals.

8. The Multi-Beam on Receive Electronically Steerable Antenna of claim 1, wherein the antenna elements are arranged in the respective Tx and Rx arrays 1so as to be interspaced of about half wavelength ($\lambda/2$) to result in the Tx and Rx arrays 1 being fully-populated.

9. A method for reducing side lobe levels in a Multi-Beam on Receive Electronically Steerable Antenna (MBR ESA), comprising:

providing a transmit (Tx) array comprising a phased array of Tx antenna elements and having, in a Tx array plane, a first geometric aperture with one or more first pairs of parallel opposite sides;

providing a receive (Rx) array comprising a fully-populated phased array of Rx antenna elements and having, in an Rx array plane either coplanar with or parallel to the Tx array plane, a second geometric aperture with one or more second pairs of parallel opposite sides;

wherein the first geometric aperture of the Tx array is rotated relative to the second geometric aperture of the Rx array to such an extent that one or more pairs of parallel opposite sides of the first geometric aperture of the Tx array are inclined or tilted relative to one or more pairs of parallel opposite sides of the second geometric aperture of the Rx array by a non-zero angle other than, in particular lower than, 90°; and providing an Antenna Controller designed to cause the Tx antenna elements to transmit an RF Tx beam having a Tx pattern with a wide Tx beamwidth, and the Rx antenna elements to simultaneously receive multiple RF beams processable to simultaneously synthesize multiple Rx beams from the multiple RF beams, the multiple Rx beams having Rx patterns with Rx beamwidths individually narrower than the Tx beamwidth;

wherein:

a number of Tx antenna elements is lower than a number of Rx antenna elements;

the Tx beam has a lower directivity than individual ones of the multiple Rx beams so as to result in the Tx beam having a wider azimuthal and/or elevational beamwidth than the individual ones of the multiple Rx beams; and the Tx array has a gain lower than the Rx array.

10. The method of claim 9, wherein the first and second geometric apertures of the Tx and Rx arrays each comprises at least two pairs of parallel opposite sides;

and wherein the first geometric aperture of the Tx array is rotated relative to the second geometric aperture of the Rx array to such an extent that both first pairs of parallel opposite sides of the first geometric aperture of the Tx array are inclined relative to both second pairs of parallel opposite sides of the second geometric aperture of the Rx array.

11. The method of claim 9, wherein the first geometric apertures of the Tx and Rx arrays are four-sided.

12. The method of claim 11, wherein the first geometric aperture of the Tx array is either a square or a rhomb, and the second geometric aperture of the Rx array is either a rectangle or a parallelogram.

13. The method of claim 9, wherein the Antenna Controller is further designed to cause a tapering function to be applied either to the Rx patterns only or to the Tx-Rx pattern, with one or more lower thresholds associated to the near side-lobes and one or more higher thresholds associated to the mid-far side-lobes.

14. The method of claim 9, wherein the Multi-Beam on Receive Electronically Steerable Antenna is provided with a bistatic architecture, where the Tx and Rx arrays are physically separated, and the Tx array is formed of Tx-only antenna elements and the Rx array is formed of Rx-only antenna elements.

15. The method of claim 9, wherein the Multi-Beam on Receive Electronically Steerable Antenna is provided with a monostatic architecture, where the Tx and Rx arrays are co-located to form a Tx-Rx array where the antenna elements are both transmitting and receiving antenna elements and are individually selectable to either transmit or receive RF signals.

16. The method of claim 9, wherein the antenna elements are arranged in the respective Tx and Rx arrays so as to be interspaced of about half wavelength ($\lambda/2$) to result in the Tx and Rx arrays being fully-populated.

* * * * *